US012634745B2

(12) United States Patent
Chang et al.

(10) Patent No.: US 12,634,745 B2
(45) Date of Patent: May 19, 2026

(54) COMMUNICATION SYSTEM AND RESOURCE RESERVATION METHOD

(71) Applicant: QUANTA COMPUTER INC., Taoyuan City (TW)

(72) Inventors: Yan-Cheng Chang, Taoyuan City (TW); Steve Cheng, Taoyuan City (TW)

(73) Assignee: QUANTA COMPUTER INC., Taoyuan City (TW)

( * ) Notice: Subject to any disclaimer, the term of this patent is extended or adjusted under 35 U.S.C. 154(b) by 92 days.

(21) Appl. No.: 18/922,472

(22) Filed: Oct. 22, 2024

(65) Prior Publication Data

US 2026/0019861 A1     Jan. 15, 2026

(30) Foreign Application Priority Data

Jul. 15, 2024   (TW) ................................. 113126464

(51) Int. Cl.
*H04W 28/02* (2009.01)
*H04W 28/24* (2009.01)

(52) U.S. Cl.
CPC ....... *H04W 28/0268* (2013.01); *H04W 28/24* (2013.01)

(58) Field of Classification Search
CPC . H04W 28/0268; H04W 28/24; H04W 48/18; H04L 45/306
See application file for complete search history.

(56) References Cited

U.S. PATENT DOCUMENTS 5,408,465 A * 4/1995 Gusella .............. H04Q 11/0478
                                                        370/231
6,163,807 A * 12/2000 Hodgkinson ........... H04L 47/70
                                                        709/229

(Continued)

FOREIGN PATENT DOCUMENTS

WO       2022234550 A1    11/2022

OTHER PUBLICATIONS

TW Office Action dated Feb. 17, 2025 in Taiwan application No. 113126464.

*Primary Examiner* — Muhammad Raza
(74) *Attorney, Agent, or Firm* — McClure, Qualey & Rodack, LLP

(57) ABSTRACT

A communication system, is coupled to a terminal device through an air interface. The terminal device executes an application program. The communication system includes a data management repository module and a control module. The data management repository module is used to store a configuration file of the terminal device, and the configuration file reflects a quality of service (QOS) requirement of the terminal device. The control module is used to automatically detect an activation of the application program on the terminal device, and allocate at least one application slice to the application program of the terminal device according to the configuration file. The communication system reserves an end-to-end resource for the application program of the terminal device according to the QoS requirement of the terminal device, the end-to-end resource comprises a radio resource, a core network application resource and a core network user plane resource.

10 Claims, 10 Drawing Sheets

Terminal device 50          Base station 600          Data module 400          Data network 500

(56)               References Cited

U.S. PATENT DOCUMENTS

| | | | | | |
|---|---|---|---|---|---|
| 6,584,080 | B1 * | 6/2003 | Ganz | H04L 1/1825 | 370/316 |
| 6,611,522 | B1 * | 8/2003 | Zheng | H04L 45/742 | 370/395.42 |
| 6,728,365 | B1 * | 4/2004 | Li | H04W 8/04 | 455/452.2 |
| 6,738,819 | B1 * | 5/2004 | Li | H04L 47/822 | 709/227 |
| 6,760,312 | B1 * | 7/2004 | Hitzeman | H04L 12/6418 | 379/142.01 |
| 6,804,717 | B1 * | 10/2004 | Bakshi | H04L 65/80 | 709/225 |
| 7,623,458 | B2 * | 11/2009 | Ayyagari | H04L 47/70 | 370/235 |
| 8,014,273 | B1 * | 9/2011 | Barrett | H04L 41/0896 | 370/210 |
| 8,160,072 | B1 * | 4/2012 | Gnanasekaran | H04L 47/2441 | 370/468 |
| 8,787,917 | B1 * | 7/2014 | Barrett | G01C 21/3461 | 455/445 |
| 11,252,655 | B1 * | 2/2022 | Gupta | H04L 67/02 | |
| 11,296,953 | B1 * | 4/2022 | Ponnuswamy | H04L 41/5009 | |
| 11,310,733 | B1 * | 4/2022 | Gupta | H04W 28/0268 | |
| 11,870,638 | B1 * | 1/2024 | Rahman | H04L 41/0663 | |
| 2002/0119821 | A1 * | 8/2002 | Sen | H04L 65/403 | 463/42 |
| 2002/0147828 | A1 * | 10/2002 | Chen | H04W 28/24 | 709/228 |
| 2003/0009580 | A1 * | 1/2003 | Chen | H04W 72/02 | 709/228 |
| 2006/0056291 | A1 * | 3/2006 | Baker | H04L 43/00 | 370/229 |
| 2006/0268908 | A1 * | 11/2006 | Wang | H04L 47/762 | 370/401 |
| 2006/0274650 | A1 * | 12/2006 | Tyagi | H04L 47/822 | 370/389 |
| 2007/0104215 | A1 * | 5/2007 | Wang | H04L 47/724 | 370/458 |
| 2007/0116004 | A1 * | 5/2007 | Kang | H04L 47/15 | 370/395.2 |
| 2007/0230358 | A1 * | 10/2007 | Narayanan | H04L 67/142 | 370/244 |
| 2007/0286117 | A1 * | 12/2007 | Balasubramanian | H04W 28/24 | 370/328 |
| 2007/0286203 | A1 * | 12/2007 | Lv | H04L 45/50 | 370/395.2 |
| 2007/0288630 | A1 * | 12/2007 | De Noia | H04L 43/06 | 709/224 |
| 2008/0240112 | A1 * | 10/2008 | Muqattash | H04W 40/28 | 370/395.31 |
| 2009/0003194 | A1 * | 1/2009 | Schelen | G06F 21/56 | 370/218 |
| 2010/0098096 | A1 * | 4/2010 | Yang | H04L 47/724 | 370/401 |
| 2010/0232441 | A1 * | 9/2010 | Verma | H04L 12/2876 | 370/401 |
| 2011/0261831 | A1 * | 10/2011 | Sharma | H04L 47/17 | 370/412 |
| 2012/0069837 | A1 * | 3/2012 | Pearce | H04L 47/52 | 370/352 |
| 2012/0155398 | A1 * | 6/2012 | Oyman | H04W 28/24 | 370/329 |
| 2012/0236714 | A1 * | 9/2012 | Aloush | H04L 47/825 | 370/230 |
| 2012/0287784 | A1 * | 11/2012 | Shatzkamer | H04W 28/26 | 370/230.1 |
| 2017/0141973 | A1 * | 5/2017 | Vrzic | H04W 16/02 | |
| 2019/0104029 | A1 * | 4/2019 | Guim Bernat | H04L 41/5022 | |
| 2019/0281494 | A1 * | 9/2019 | Chan | H04L 45/851 | |
| 2019/0373661 | A1 * | 12/2019 | Kousaridas | H04W 76/11 | |
| 2020/0068430 | A1 * | 2/2020 | Chan | H04W 28/0284 | |
| 2021/0045091 | A1 * | 2/2021 | Arora | H04W 16/04 | |
| 2021/0274375 | A1 * | 9/2021 | Li | H04W 28/10 | |
| 2021/0377814 | A1 | 12/2021 | Sillanpaa | | |
| 2022/0053375 | A1 | 2/2022 | Asawa | | |
| 2022/0116335 | A1 * | 4/2022 | Sharma Banjade | H04W 24/02 | |
| 2022/0174575 | A1 | 6/2022 | Yang | | |
| 2022/0191303 | A1 * | 6/2022 | Gupta | H04L 67/61 | |
| 2023/0037228 | A1 * | 2/2023 | Panigrahi | H04W 24/02 | |
| 2023/0232241 | A1 * | 7/2023 | Jiang | H04W 16/10 | 370/254 |
| 2024/0380673 | A1 * | 11/2024 | Yanggratoke | H04W 24/04 | |
| 2024/0396622 | A1 * | 11/2024 | Sugyo | H04W 40/02 | |

* cited by examiner

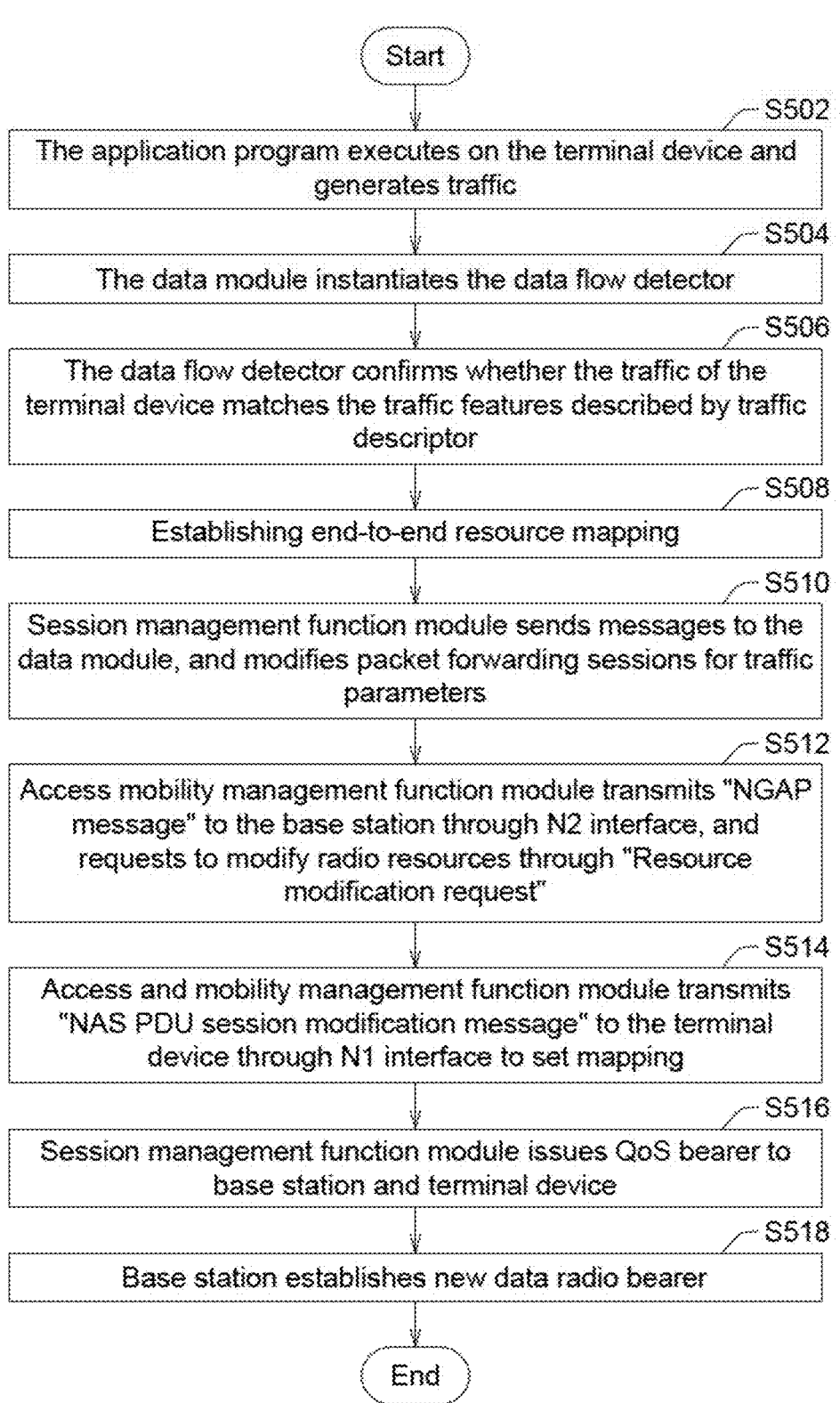

Start

S502
The application program executes on the terminal device and generates traffic S504
The data module instantiates the data flow detector S506
The data flow detector confirms whether the traffic of the terminal device matches the traffic features described by traffic descriptor S508
Establishing end-to-end resource mapping S510
Session management function module sends messages to the data module, and modifies packet forwarding sessions for traffic parameters S512
Access mobility management function module transmits "NGAP message" to the base station through N2 interface, and requests to modify radio resources through "Resource modification request"

S514
Access and mobility management function module transmits "NAS PDU session modification message" to the terminal device through N1 interface to set mapping S516
Session management function module issues QoS bearer to base station and terminal device S518
Base station establishes new data radio bearer End

FIG. 5

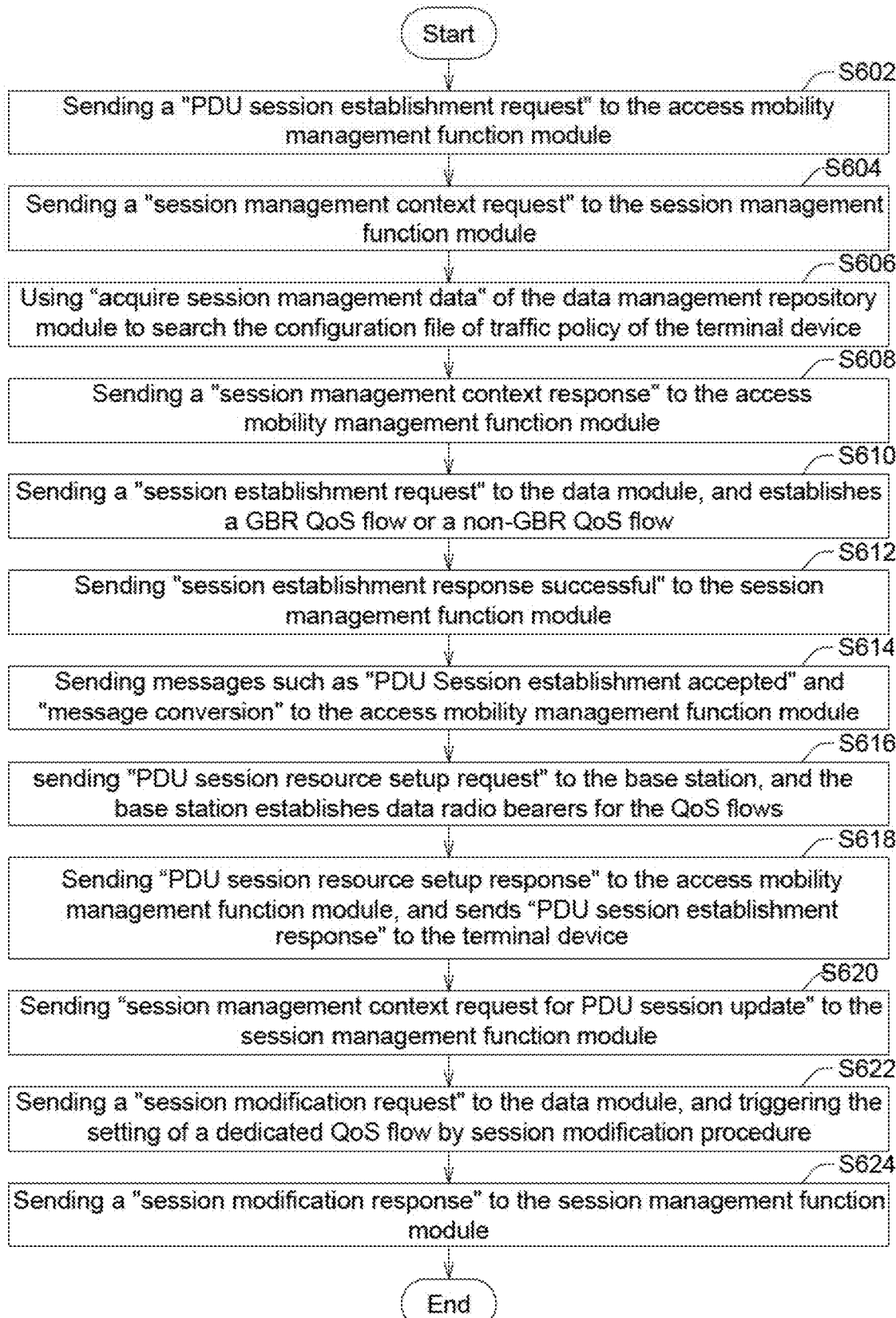

Start

S602
Sending a "PDU session establishment request" to the access mobility management function module S604
Sending a "session management context request" to the session management function module S606
Using "acquire session management data" of the data management repository module to search the configuration file of traffic policy of the terminal device S608
Sending a "session management context response" to the access mobility management function module S610
Sending a "session establishment request" to the data module, and establishes a GBR QoS flow or a non-GBR QoS flow S612
Sending "session establishment response successful" to the session management function module S614
Sending messages such as "PDU Session establishment accepted" and "message conversion" to the access mobility management function module S616
sending "PDU session resource setup request" to the base station, and the base station establishes data radio bearers for the QoS flows S618
Sending "PDU session resource setup response" to the access mobility management function module, and sends "PDU session establishment response" to the terminal device S620
Sending "session management context request for PDU session update" to the session management function module S622
Sending a "session modification request" to the data module, and triggering the setting of a dedicated QoS flow by session modification procedure S624
Sending a "session modification response" to the session management function module End

FIG. 6B

COMMUNICATION SYSTEM AND RESOURCE RESERVATION METHOD

This application claims the benefit of Taiwan application Serial No. 113126464, filed Jul. 15, 2024, and the disclosure of which is incorporated by reference herein in its entirety.

TECHNICAL FIELD

The present disclosure relates to a communication system, in particular, relates to a 5G mobile communication system and a resource reservation method applied to the system.

BACKGROUND

With the progress of communication technology, the communication system has evolved to the fifth generation mobile communication system (i.e., the 5G mobile communication system, referred to as the "5G system"). The 5G system provides resources of end-to-end quality of service (QOS) for user's terminal device, so as to ensure the communication quality of the application program executed by the terminal device. The end-to-end QoS includes a level of guaranteed bit rate (GBR) or a level of not guaranteed bit rate (non-GBR).

In the existing 5G system, resources are reserved for the terminal device according to a mechanism of network slice (i.e., a slice of session layer), and the network slice is allocated according to the configuration file of the terminal device. When the application program is activated on the terminal device, a message or command is sent by a wireless side (i.e., from user's terminal device) to trigger resource reservation. Certain specific application programs can be activated and terminated based on explicit messages or commands, such as an application program of digital voice service executed on the terminal device. This application program can effectively perform resource reservation through messages or commands. However, most over-the-top (OTT) applications executed on the terminal device do not have explicit messages or commands, making it difficult to trigger resource reservation clearly and effectively.

In view of the above issues, it is necessary to provide an improved resource reservation mechanism that can automatically detect an execution of an application program on the terminal device by the network side, create corresponding application slices, and reserve resources for the application program on the terminal device.

SUMMARY

According to one embodiment of the present disclosure, a communication system is provided. The communication system is coupled to a terminal device through an air interface, and the terminal device executes an application program. The communication system includes a data management repository module and a control module. The data management repository module is for storing a configuration file of the terminal device, the configuration file reflects a quality of service (QOS) requirement of the terminal device. The control module is for detecting an activation of the application program on the terminal device, and allocating at least one application slice to the application program on the terminal device according to the configuration file. The communication system reserves an end-to-end resource for the application program of the terminal device according to the QoS requirement of the terminal device, the end-to-end resource comprises a radio resource, a core network application resource and a core network user plane resource.

According to one embodiment of the present disclosure, a resource reservation method is provided. The communication system is coupled to a terminal device through an air interface, and the terminal device executes an application program. The resource reservation method includes the following steps. Storing a configuration file of the terminal device by a data management repository module of the communication system, and the configuration file reflects a quality of service (QOS) requirement of the terminal device. Detecting an activation of the application program on the terminal device, by a control module of the communication system. Allocating at least one application slice to the application program on the terminal device according to the configuration file, by the control module. The communication system reserves an end-to-end resource for the application program of the terminal device according to the QoS requirement of the terminal device, the end-to-end resource comprises a radio resource, a core network application resource and a core network user plane resource.

BRIEF DESCRIPTION OF THE DRAWINGS

FIG. 5 is a flow chart of a resource mapping process of an application slice according to an embodiment of the present disclosure.

FIG. 6B is a flow chart of the transmission process of the messages/commands in FIG. 6A.

Figure 1:
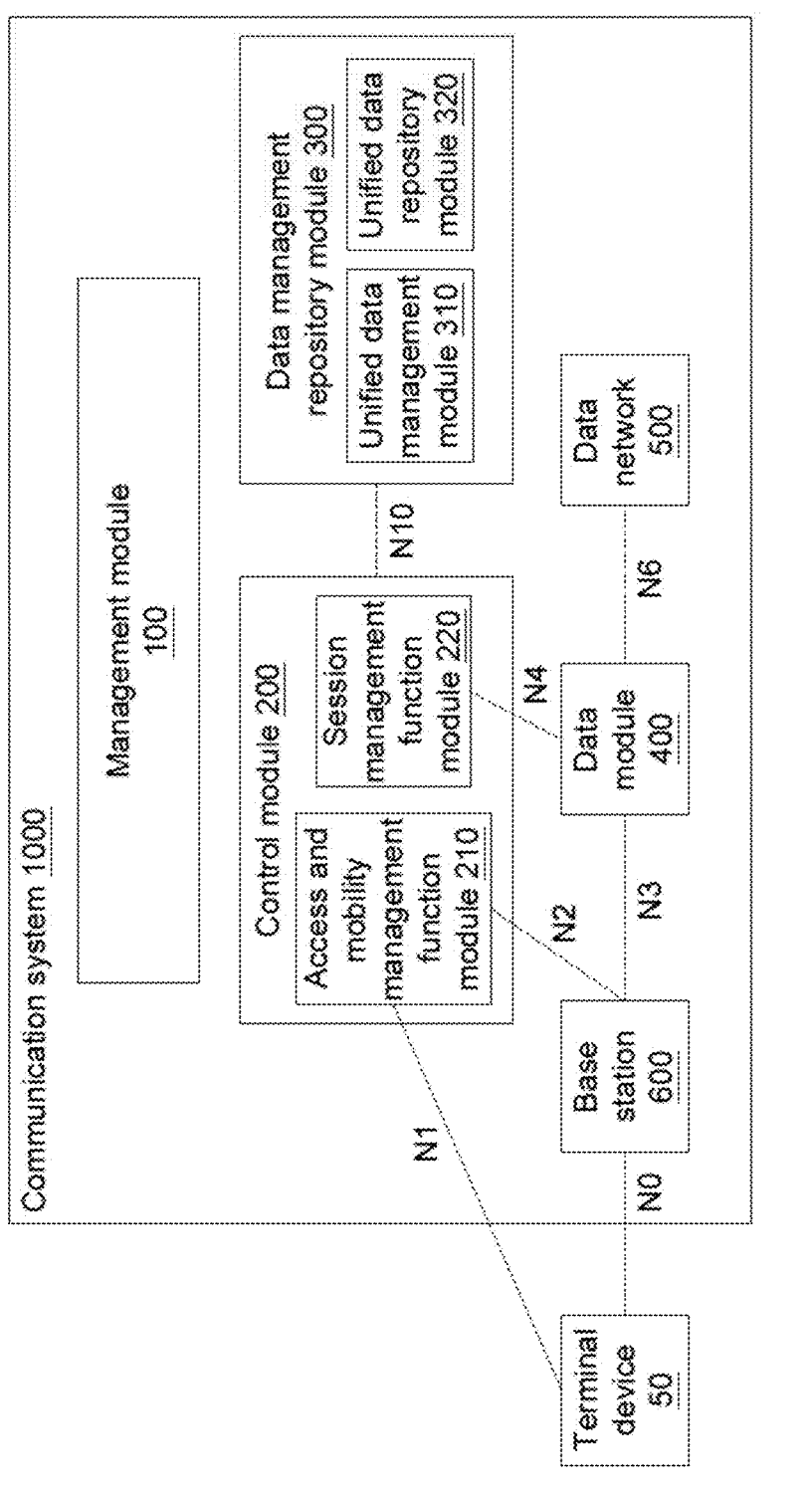
FIG. 1 is a block diagram of a communication system 1000 according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

FIG. 1 is a block diagram of a communication system 1000 according to an embodiment of the present disclosure. The communication system 1000 is, for example, a 5G mobile communication system (which may be referred to as a "5G system"). The communication system 1000 includes: a management module 100, a control module 200, a data management repository module 300, a data module 400, a data network 500, and a base station 600.

The base station 600 is, for example, a next generation node base (gNB) of the 5G system standard, or a node of a radio access network (RAN). The base station 600 may communicate with the terminal device 50 through an air interface NO of the 5G system standard. The terminal device 50 is a user equipment (UE) or a customer premise equipment (CPE), such as a wireless network router. The user of the terminal device 50 is a user terminal or client terminal.

Viewed from another perspective, the communication system 1000 provides an end-to-end network to the user of the terminal device 50. The communication path of the end-to-end network includes: the terminal device 50, the radio access network (i.e., the base station 600), the data module 400, the data network 500, the control module 200, and the data management repository module 300. Furthermore, the data module 400, the data network 500, the control module 200, and the data management repository module 300 constitute the core network of the communication system 1000.

More specifically, the control module 200 is, for example, a control plane module of the 5G system standard. The control module 200 includes: an access and mobility management function (AMF) module 210 and a session management function (SMF) module 220, which perform accessing and mobility managing and session managing, respectively. The data management and repository module 300 includes: a unified data management (UDM) module 310 and a unified data repository (UDR) module 320, which perform data managing and data storing, respectively.

The data module 400 is, for example, a data plane module of the 5G system standard, which may be referred to as a user plane function (UPF) module. The management module 100 is, for example, a management plane module of the 5G system standard. A system operator or a system manager of the communication system 1000 controls the core network of the communication system 1000 (i.e., the data module 400, the data network 500, the control module 200, and the data management repository module 300) through the management module 100.

As mentioned above, the terminal device 50 communicates with the base station 600 through the air interface NO. In addition, the terminal device 50 communicates with the control module 200 through the interface N1, the base station 600 communicates with the control module 200 through the interface N2, the base station 600 communicates with the data module 400 through the interface N3, and the control module 200 communicates with the data module 400 through the interface N4, the data module 400 communicates with the data network 500 through the interface N6, and the control module 200 communicates with the data management repository module 300 through the interface N10. The above-mentioned interfaces NO, N1, N2, N3, N4, N6 and N10 are communication interfaces of the 5G system standard, which are formulated by the "3GPP organization". Each device and module of the communication system 1000 can exchange information through the interfaces N0, N1, N2, N3, N4, N6 and N10.

The communication system 1000 has three types of resources: (1) radio resource, (2) core network application resource, and (3) core network user plane resource. The radio resource refers to the on-the-air (OTA) bandwidth allocated by the communication system 1000 to the base station 600. The core network application resource refers to the bandwidth allocated by the communication system 1000 to the data network 500 or the bandwidth allocated to the terminal device 50 from the data network 500. The core network user plane resource refers to the dedicated computing resource of the control module 200 and the data module 400. The "end-to-end resource" of the communication system 1000 may include the above-mentioned radio resource, core network application resource, and core network user plane resource on the communication path of the end-to-end network.

Moreover, in the 5G system standard, the 3GPP organization has formulated a quality of service (QOS) (i.e., end-to-end QoS) of the end-to-end network of the communication system 1000, and formulated a QoS data flow (may be referred to as "QoS" flow). The communication system 1000 has two types of QoS flows: (1) a default QoS flow, and (2) a dedicated QoS flow. Based on the end-to-end QoS of the communication system 1000, the QoS flow can be classified as two levels: (1) the QoS flow that requires a guaranteed bit rate (GBR), and (2) the QoS flow that does not require a guaranteed bit rate (non-GBR). For example, when the application program executed by the terminal device 50 is a voice call, video call, video streaming or web browser, these applications require bandwidth of higher priority and faster response time, hence the GBR QoS flow may be allocated to these applications. In contrast, other types of applications that do not need to guarantee traffic and response time, are allocated with non-GBR QoS flows.

According to the QoS requirements of the application program executed by the terminal device 50, the communication system 1000 may reserve radio resources, core network application resources, and core network user plane resources for the application program executed by the terminal device 50. Refer to the resource reservation mechanism of the existing communication system: in the physical network architecture, a separated part of the network logic of the 5G system standard is referred to as "network slice" (i.e., a slice of the session layer). The 3GPP organization has developed five types of network slices, including: enhanced mobile broadband (eMBB), ultra-reliable low-latency communications (uRLLC), massive Internet of Things (MIoT), Internet of Vehicles (CV2X), and high-performance machines type communication (HMTC). Existing communication system allocates dedicated end-to-end resources to each network slice, and reserve resources for application programs on the terminal device 50 according to the network slice mechanism.

Different from existing communication systems, the communication system 1000 of the present disclosure performs resource reservation based on the mechanism of an application slice (i.e., a slice of the application layer). The communication system 1000 of the present disclosure can perform resource reservation in three ways based on application slice: (1) based on application slice of user-defined application programs executed on a specific terminal device 50, (2) based on known or common application slice of the application program, and (3) the application slice corresponding to the type of the terminal device 50 specified by the user or the device group to which the terminal device 50 belongs.

Existing communication system triggers application slice from the wireless side (i.e., from the user's terminal device), triggers application slice from the terminal device 50 or based on a command of an application function. In contrast, the communication system 1000 of the present disclosure triggers application slice from the network side. For example, the control module 200 transmits commands to the base station 600 and maps them to the data flow of the user of the terminal device 50 through the data radio bearer (DRB), and then triggers application slice. The application slice is allocated to the application program of the terminal device 50, corresponding resources are reserved for the application program, and a corresponding QoS flow is established. A more detailed example is as follows: the session management function module 220 of the control module 200 sends messages or commands to the data module 400 through the interface N4, and the access mobility management function module 210 sends messages or commands to the terminal device 50 through the interface N1, so as to trigger application slice for the application program of the terminal device 50, and to establish a QoS flow of 5G system standard. The terminal device 50 can be assigned to a specific device group. For the application program of the terminal device 50 in the device group, the control module 200 automatically detects the activation of the application program on the terminal device 50 based on the application signature, and allocate at least one application slice for the application program of the terminal device 50.

Figure 2:
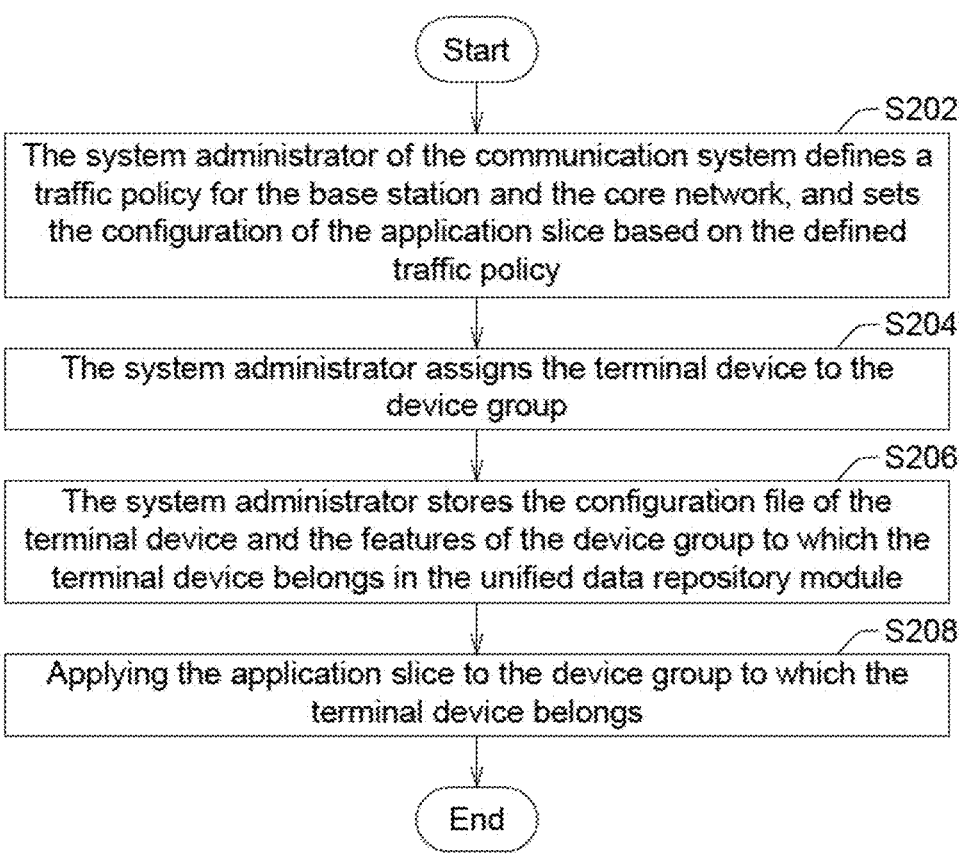
FIG. 2 is a flow chart of the allocating process of the application slice according to an embodiment of the present disclosure.

FIG. 2 is a flow chart of the allocating process of the application slice according to an embodiment of the present disclosure. First, step S202 is performed: the system administrator of the communication system 1000 defines a traffic policy through the management module 100. The traffic policy is associated with the base station 600 and the core network (i.e., the data module 400, data network 500, control module 200, and data management repository module 300). Furthermore, the system administrator sets the QoS configuration of the terminal device 50 according to the traffic policy. The QoS configuration is associated with the application slice that may correspond to the application program. More specifically, the QoS configuration represents the QoS profile of the terminal device 50, which includes several QoS parameters, as shown in Table 1:

TABLE 1

| QoS parameters | Guaranteed rate required (GBR) | Guaranteed rate not required (non-GBR) |
| --- | --- | --- |
| 5G QoS Identifier (5QI) | yes | yes |
| Allocation and Reservation Priority (ARP) | yes | yes |
| Reflective QoS Attributes (RQA) | No | optional |
| Guaranteed flow bit rate (GFBR) | yes | No |
| Maximum flow bit rate (MFBR) | yes | No |
| Notification control | optional | No |
| Maximum Packet Loss Rate (MPLR) | Optional (only for voice) | No |
| Session aggregate maximum bit rate (Session AMBR) | No | yes |
| User Device Aggregate Maximum Bit Rate (UE-AMBR) | No | yes |

The QoS parameters are, for example: 5G QOS Identifier (5Q1), allocation and retention priority (ARP), reflective qos attributes (RQA), guaranteed flow bit rate (GFBR), maximum flow bit rate (MFBR), notification control, maximum packet loss rate (MPLR), session aggregate maximum bit rates (session AMBR), and user equipment aggregate maximum bit rates (UE-AMBR). Among them, 5QI is a scalar based on a set of QoS features. The correspondence between 5Q1 and QoS features can be standardized, pre-allocated, or dynamically adjusted when setting or modifying the QoS flow.

Then, step S204 is performed: the system administrator assigns the terminal device 50 to the device group. For example, if the terminal device 50 is a security monitor, the terminal device 50 can be assigned to the camera group.

Then, step S206 is executed: the system administrator stores the configuration file of the terminal device 50 and the features of the device group to which the terminal device 50 belongs in the unified data repository module 320. The configuration file of the terminal device 50 is a QoS setting file, which can reflect the QoS requirements of the terminal device 50.

Then, step S208 is executed: applying the application slice to the device group to which the terminal device 50 belongs. In one example, multiple application slices can be applied to one device group.

Figure 3:
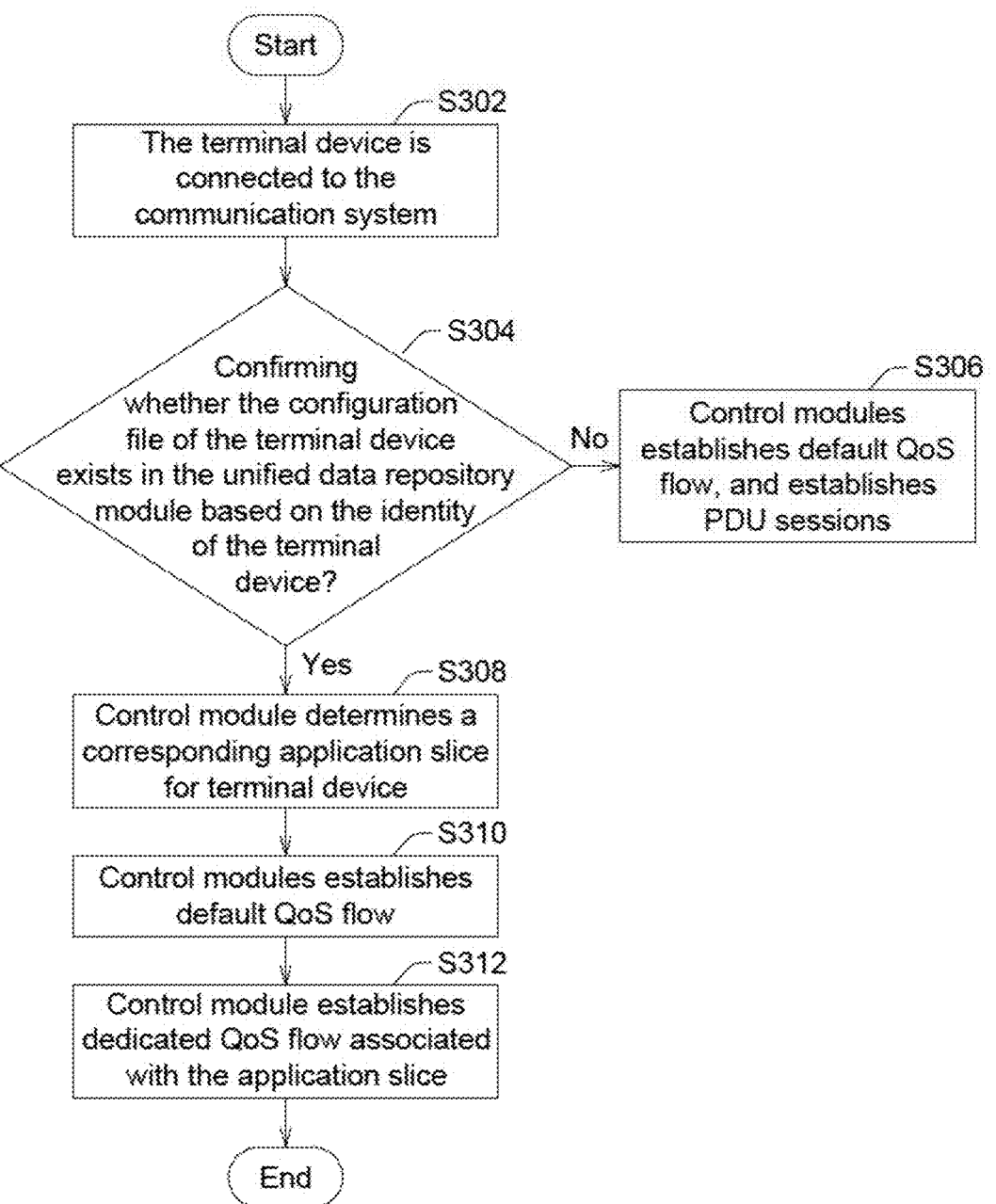
FIG. 3 is a flow chart of an establishing process for an application slice according to an embodiment of the present disclosure.

FIG. 3 is a flow chart of an establishing process for an application slice according to an embodiment of the present disclosure. First, step S302 is performed: the terminal device 50 is connected to the communication system 1000. For example, the terminal device 50 is communicatively coupled to the base station 600 of the communication system 1000 through the air interface NO, and communicatively coupled to the control module 200 through the interface N1, and the terminal device 50 is registered with the control module 200. When registering with the control module 200, the terminal device 50 provides the configuration file to the control module 200 and stores the configuration file in the unified data repository module 320. The configuration file of the terminal device 50 is shown in Table 2-1:

TABLE 2-1

| identi-fication code of terminal device | type of terminal device | device group of the terminal device | application | identi-fication code of application slice | QoS parameters |
| --- | --- | --- | --- | --- | --- |
| 01 | security monitor | camera | APP1 | A1 | GFBR ARP MPLR |
| | | | APP2 | A1 | GFBR MFBR UE-AMBR |
| | | | APP3 | A2 | GFBR MFBR MPLR |
| | | | APP4 | A2 | GFBR MPLR UE-AMBR |

The configuration file of the terminal device 50 records the identification code, type, device group to which the terminal device 50 belongs, the application program executed by the terminal device 50, the identification code of the possible corresponding application slice, and the QoS parameters. The QoS parameters are, for example, the parameters listed in Table 1. The QoS parameters may reflect the QoS requirements of the user side of the terminal device 50.

Then, step S304 is executed: the control module 200 analyzes the feature table of the terminal device 50, and confirms the identity of the terminal device 50 according to the identification code of the terminal device 50. Furthermore, the control module 200 confirms whether the configuration file of the terminal device 50 exists in the unified data repository module 320 based on the identity of the terminal device 50.

If the confirmation result of step S304 is "no", step S306 is executed: the control module 200 establishes a default QoS flow for the application program of the terminal device 50, and the session management function module 220 of the control module 200 establishes a packet data unit session (PDU session) based on the default QoS flow.

If the confirmation result of step S304 is "yes", then step S308 is executed: the control module 200 determines the corresponding application slice for the terminal device 50, and the terminal device 50 (and the QoS flow of the terminal device 50) becomes a part of the above determined application slice. The session management function module 220 establishes two PDU sessions based on the application slice. The first PDU session is used in step S310: the control module 200 establishes a default QoS flow.

The second PDU session is used for step S312 after step S310: the control module 200 establishes a dedicated QoS flow associated with the application slice. During the establishing process of the dedicated QoS flow, the control module 200 reserves resources for the application program of the terminal device 50 according to the application slice. There are two ways for resource reservation: (1) static resource reservation, and (2) dynamic resource reservation.

The way for the static resource reservation is as follows: the session management function module 220 sets a logical PDU session for the application program of the terminal device 50 (that is, the PDU session is associated with the application program of the terminal device 50). When the session management function module 220 sets a logical PDU session, the session management function module 220 may allocate the application slice according to the configuration file of the terminal device 50. In other words, the allocation of application slice and/or network slice is static. More specifically, the session management function module 220 maps the terminal device identification code and type recorded in the configuration file of the terminal device 50 to the identification code of the application slice corresponding to the application program. Also, application slice is allocated to the application program. Then, the session management function module 220 selects an appropriate network slice to transmit the QoS flow according to the QoS parameters recorded in the configuration file of the terminal device 50. In other words, the session management function module 220 can select corresponding application slice according to a combination of the identity (identification code and type) of the terminal device 50 and the application program.

In another example, the session management function module 220 can select the corresponding application slice according to the type of known or common application programs. Alternatively, the session management function module 220 may select the corresponding application slice according to the type of the device group of the terminal device 50 (e.g., lookup the device group recorded in the table 2-1).

In other examples, the configuration file of the terminal device 50 may also record the identification code of the network slice (as shown in Table 2-2). The session management function module 220 maps to the identification code of the network slice based on the identification code and type of terminal device, and selects the network slice to transmit the QoS flow according to the identification code of the network slice.

TABLE 2-2

| identification code of terminal device | type of terminal device | device group of the terminal device | application | identification code of network slice | identification code of application slice | QoS parameters |
|---|---|---|---|---|---|---|
| 01 | security monitor | camera | APP1 | S1 | A1 | GFBR ARP MPLR |
| | | | APP2 | S2 | A1 | GFBR MFBR UE-AMBR |
| | | | APP3 | S3 | A2 | GFBR MFBR MPLR |
| | | | APP4 | S4 | A2 | GFBR MPLR UE-AMBR |

In the way of the static resource reservation, when the terminal device 50 is connected to the communication system 1000, even if the terminal device 50 has not activated the application program, a dedicated QoS flow will be immediately set for the application program. In the static manner, the QoS flow must be provided to terminal devices 50 for all users, or the user's terminal devices 50 must send messages or commands to trigger the GBR QoS flow. Therefore, the GBR QoS flow of the base station 600 is established according to the user's demand, without wasting the resources of the communication system 1000. For example, when three applications with different GBR QoS requirements are executed, the static resource reservation will require all users to set three GBR QoS flows during initialization.

On the other hand, the way of the dynamic resource reservation is as follows: after the session management function module 220 completes the setting of the logical PDU session and when the physical data packet starts to be transmitted, the session management function module 220 can dynamically modify the configuration of the application slice and/or network slice according to the attributes of the packet flow of the data packet. In other words, the allocations of application slices and/or network slices are dynamic. More specifically, the data module 400 includes a data packet filter for identifying attributes of the packet flow. The attributes of the packet flow include, for example: (1) internet protocol (IP) address of the packet flow, (2) a transmission protocol type of the packet flow, and (3) a port number of a transmission connecting port associated with the packet flow, as shown in Table 3:

TABLE 3

| identification code of data packet | IP address | Type of transmission protocol | port number of a transmission connecting port |
|---|---|---|---|
| P01 | 140.112.1.1 | TCP | 23 |
| P02 | 140.112.10.1 | TCP | 20 |
| P03 | 140.112.2.2 | TCP | 32 |

According to the data packet attributes obtained by the data packet filter (as Table 3), the session management function module 220 can query the application programs, identification code of application slice or identification code of network slice recorded in the configuration file (as Table 2-1 or Table 2-2) of the terminal device 50, and modify the allocations of the application slice and/or network slice based on the QoS parameters. In the dynamic resource reservation, setting process for the dedicated QoS flow is activated when the application program is activated. Furthermore, in the dynamic resource reservation, the GBR QoS flow is allocated according to the traffic of the application program, rather than according to the subscription of the user of the terminal device 50. For example: for an application program of a video conference, all users of this application program can obtain GBR QoS flows to ensure the call quality of the video conference. Therefore, the dynamic resource reservation can ensure that, the resource utilization of the communication system 1000 is maximized.

On the other hand, the static resource reservation can be selectively executed in conjunction with the dynamic resource reservation. For example, the static resource reservation is performed when setting a logical PDU session, and then the dynamic resource reservation is performed when transmitting physical data packets. Alternatively, only static resource reservation or only dynamic resource reservation is performed. When only dynamically resource reservation is performed, the session management function module 220 makes modifications based on the default application slice and/or network slice.

On the other hand, the data module 400 further includes a data flow detector for detecting the traffic of data packets corresponding to the application slice, thereby obtaining traffic statistics of the data packets. The session management function module 220 can allocate or modify the QoS flow of the end-to-end network according to the traffic of data packets.

Figure 4:
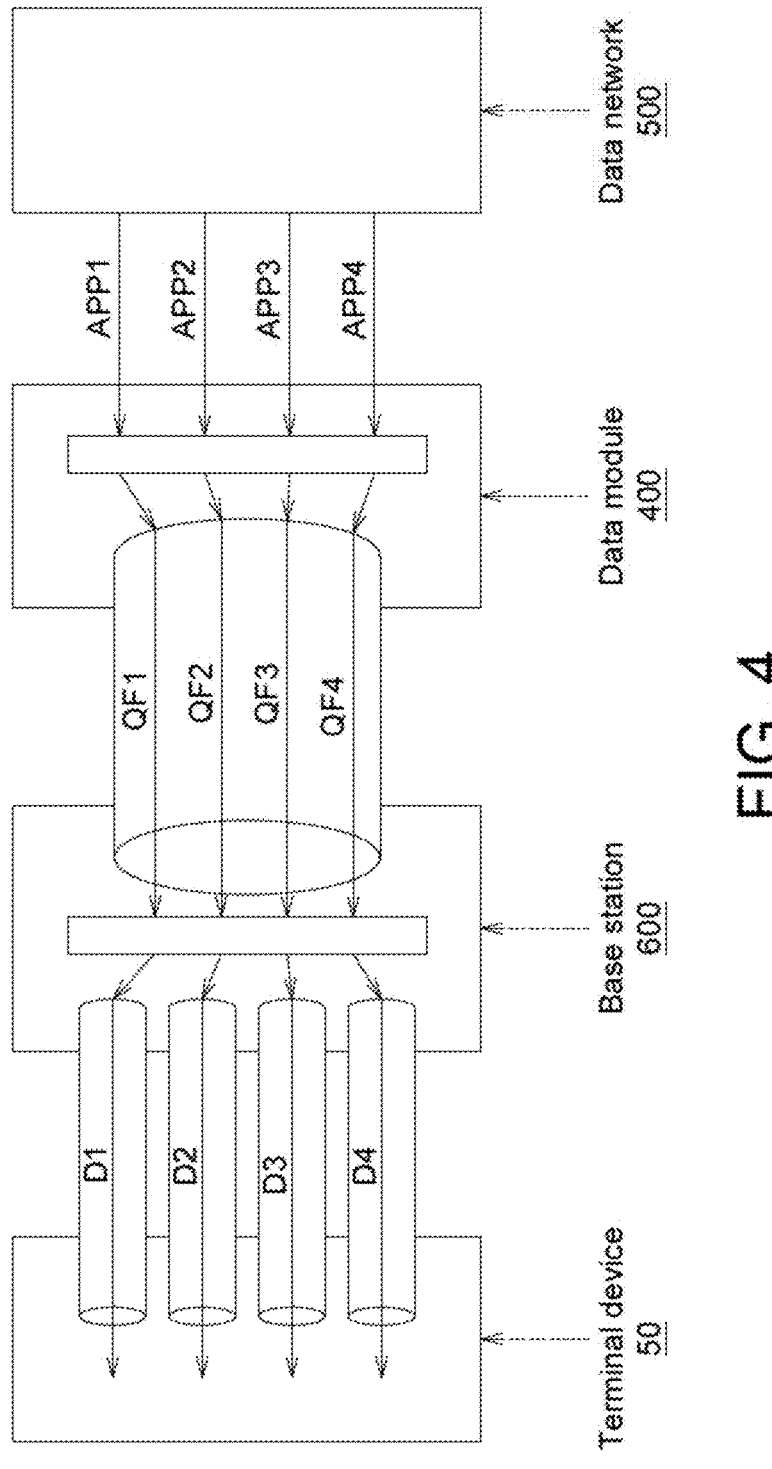
FIG. 4 is a schematic diagram of the allocation of the QoS flow of the end-to-end network according to an embodiment of the present disclosure.

FIG. 4 is a schematic diagram of the allocation of the QoS flow of the end-to-end network according to an embodiment of the present disclosure. As shown in FIG. 4, after the QoS flows QF1~QF4 are established on the end-to-end network from the terminal device 50 to the data network 500, the data packets generated by the application program executed on the terminal device 50 are classified and correspondingly allocated to one or more of the QoS flows QF1~QF4, and are allocated or mapped to the application slice. The data packets of the application are processed based on the end-to-end QoS.

For application programs APP1~APP4, the radio resources are allocated to the data radio bearers D1~D4, and core network application resources and core network user plane resources are allocated to QoS flows QF1~QF4. Accordingly, data radio bearers D1~D4 and QoS flows QF1~QF4 are used to bear the traffic of data packets of the application program transmitted in the end-to-end network (i.e., the end-to-end data traffic). In one example, the traffic of data packets generated by the application program APP1 of the terminal device 50 may be carried through the QoS flow QF1 and the data radio bearer D1. In another example, the traffic of data packets generated by the application program APP1 may be carried through the QoS flow QF1 and the data radio bearer D2.

As mentioned above, in the static resource reservation, when the session management function module 220 sets a logical PDU session, the session management function module 220 may perform allocation for the application slice based on the configuration file of the terminal device 50. During the establishing process of the PDU session, a QoS configuration of the terminal device 50 will be transmitted to the core network of the communication system 1000 (i.e., the data module 400, the data network 500, the control module 200, and the data management repository module 300). Furthermore, according to the combination of the terminal device 50 and the applications programs executed on it, the session management function module 220 reserves the end-to-end resource (including: radio resource, core network application resource, and core network user plane resource), so as to satisfy the Qos configuration of the terminal device 50 and meet the QoS requirements of the end-to-end network.

In one example, the unified data repository module 320 only stores a regular QoS configuration (i.e., the default QoS configuration) of the terminal device 50, and the data packet of the application program of the terminal device 50 are transmitted through the default QoS flow, hence can have a normal level of QoS (i.e., non-GBR). When the session management function module 220 establishes a PDU session, the default QoS flow is applied to the established PDU session.

In another example, the terminal device 50 has a specific QoS configuration, and the QoS configuration is associated with a specific application or with a specific device group. Therefore, when the terminal device 50 is connected to the communication system 1000, the PDU session established by the session management function module 220 can be applied with the default QoS flow and the dedicated QoS flow. The above-mentioned QoS flow is associated with a specific application program or a specific device group.

FIG. 5 is a flow chart of a resource mapping process of an application slice according to an embodiment of the present disclosure. First, step S502 is performed: the application program is executed on the terminal device 50, and the application program generates the traffic of data packets on the terminal device 50. Then, step S504 is executed: when the terminal device 50 is connected to the communication system 1000, the data module 400 instantiates a data flow detector. The data flow detector contains a set of traffic descriptors (this traffic descriptor is associated with the application program). The traffic descriptor includes a set of parameters to describe the traffic features of the end-to-end network, and includes a set of information to describe the QoS of forwarding process of the data packet.

Then, step S506 is performed: the data packets generated by the application program of the terminal device 50 are transmitted between the terminal device 50 and the data network 500, and the data flow detector detects the traffic of the data packets. The data flow detector confirms whether the traffic of the above-mentioned data packets matches the traffic features described by the traffic descriptor. If the confirmation result is "yes", it indicates that the traffic of the above-mentioned data packets is related to the application slice, then, the session management function module 220 of the control module 200 generates a triggered message or command.

Then, step S508 is performed: establishing an end-to-end resource mapping. Furthermore, the control module 200 automatically triggers a release command to identify idle dedicated QoS flows. Then, step S510 is executed: the session management function module 220 sends messages or commands to the data module 400, so as to modify the packet forwarding session according to the traffic parameters associated with the QoS flow. In one example, the unified data repository module 320 stores the traffic policy of the base station 600 and the core network, which corresponds to the QoS flow. The session management function module 220 obtains information of application slice according to the above traffic policy.

Then, step S512 is executed: the access mobility management function module 210 transmits a "NGAP message" to the base station 600 through the N2 interface, and requests to modify the radio resources through a "resource modification request" of the PDU session. Then, step S514 is performed: the access mobility management function module 210 sends a "NAS PDU session modification message" to the terminal device 50 through the N1 interface, so as to set the resource mapping of the application slice.

Then, step S516 is performed: the session management function module 220 initiates a QoS bearer to the base station 600 and the terminal device 50 (that is, initiating a QoS bearer from the network side), and performs data connection settings. Then, step S518 is performed: the base station 600 establishes a new data radio bearer. Alternatively, existing QoS flow is mapped to existing data radio bearers.

Figure 6A:
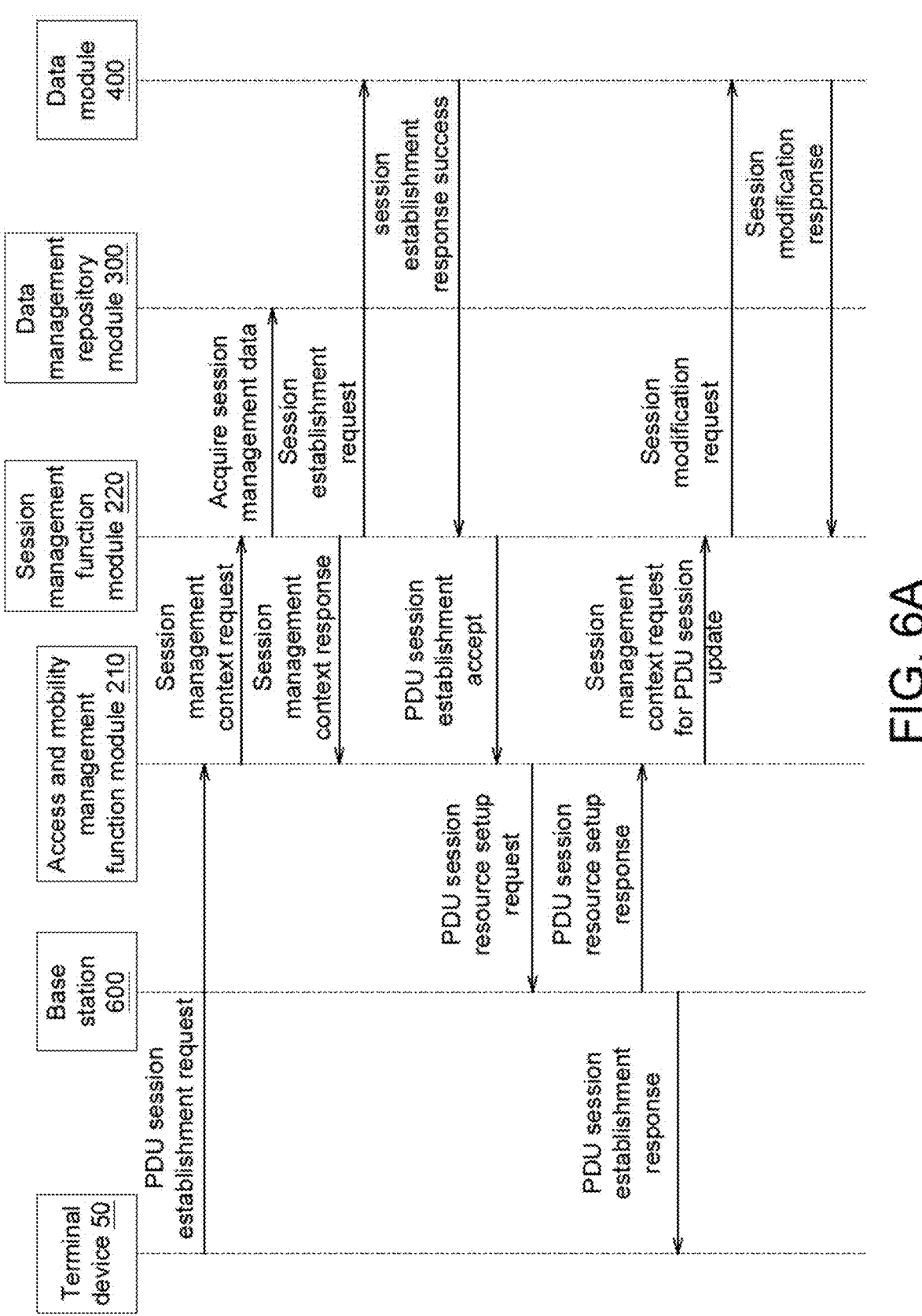
FIG. 6A is a schematic diagram illustrating transmissions of messages/commands between modules of the communication system 1000 during the establishing process of the dedicated QoS flow of the application slice.

FIG. 6A is a schematic diagram illustrating transmissions of messages/commands between modules of the communication system 1000 during the establishing process of the dedicated QoS flow of the application slice. FIG. 6B is a flow chart of the transmission process of the messages/commands in FIG. 6A. Referring to both FIGS. 6A and 6B, first, step S602 is executed: the terminal device 50 sends a "PDU session establishment request" to the access mobility management function module 210. Then, step S604 is executed: the access mobility management function module 210 sends a "session management context request" to the session management function module 220.

Then, step S606 is executed: the session management function module 220 uses the "acquire session management data" of the data management repository module 300 according to the identification code of the terminal device 50, and searches the configuration file of the terminal device 50 based on the above-mentioned acquire session management data, so as to obtain the traffic policy of the terminal device 50. Furthermore, the session management function module 220 confirms whether to apply application slice according to the traffic policy. If the traffic policy of the terminal device 50 is corresponding to the application slice, then a dedicated QoS flow for the terminal device 50 is set during the establishment of the initial PDU session.

Then, step S608 is executed: the session management function module 220 sends a "session management context response" to the access mobility management function module 210. Then, step S610 is executed: the session management function module 220 sends a "session establishment request" to the data module 400. A GBR QOS flow or a non-GBR QoS flow is established according to the traffic policy of the terminal device 50. Alternatively, the data module 400 instantiates the data flow detector associated with the application slice. Then, step S612 is executed: the data module 400 sends "session establishment response successful" to the session management function module 220. Then, step S614 is executed: the session management function module 220 sends messages such as "PDU Session establishment accepted" and "message conversion", etc. to the access mobility management function module 210.

Then, step S616 is executed: the access mobility management function module 210 sends messages such as "PDU session resource set request" and "PDU session establishment accept", etc. to the base station 600, and the base station 600 establishes data radio bearers for the QoS flows. During the process of establishing the data radio bearers, resources are reserved for the application slice when the initial PDU session is established, regardless of whether the corresponding application is being executed.

Then, step S618 is executed: the base station 600 sends the "PDU session resource set response" to the access mobility management function module 210. Furthermore, the base station 600 sends the "PDU session establishment response" to the terminal device 50. Then, step S620 is executed: the access mobility management function module 210 sends the "session management context request for PDU session update" to the session management function module 220.

Then, step S622 is executed: the session management function module 220 sends a "session modification request" to the data module 400, so as to request a session modification procedure for the PDU session. Moreover, the above session modification procedure triggers the setting of a dedicated QoS flow. Then, step S624 is executed: the data module 400 sends a "session modification response" to the session management function module 220. After receiving the "session modification response", the session management function module 220 may perform the session modification procedure of the PDU session.

Figure 7A:
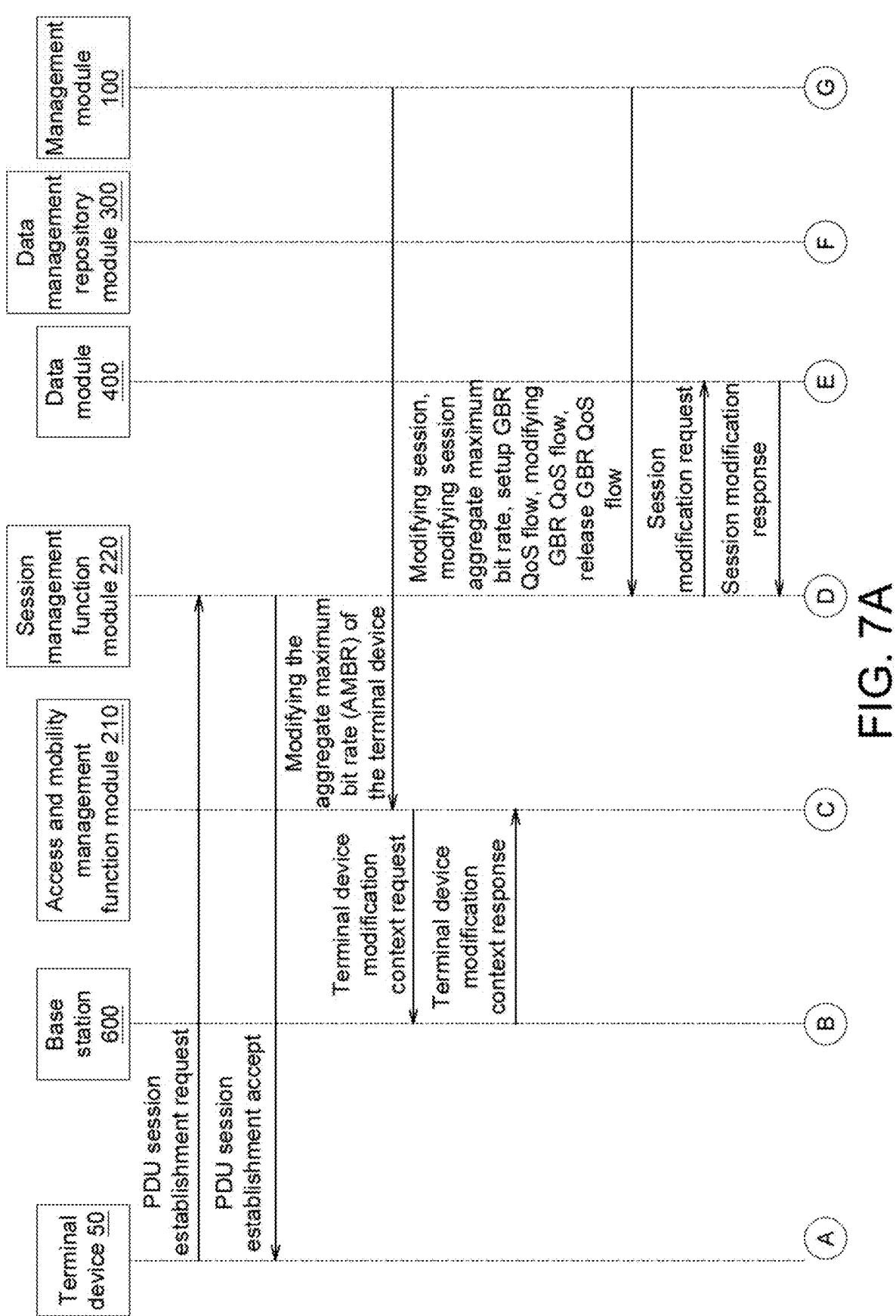
FIGS. 7A and 7B are schematic diagrams illustrating transmission of messages/commands between modules of the communication system 1000 during the session modification process of the QoS flow.
Figure 7B:
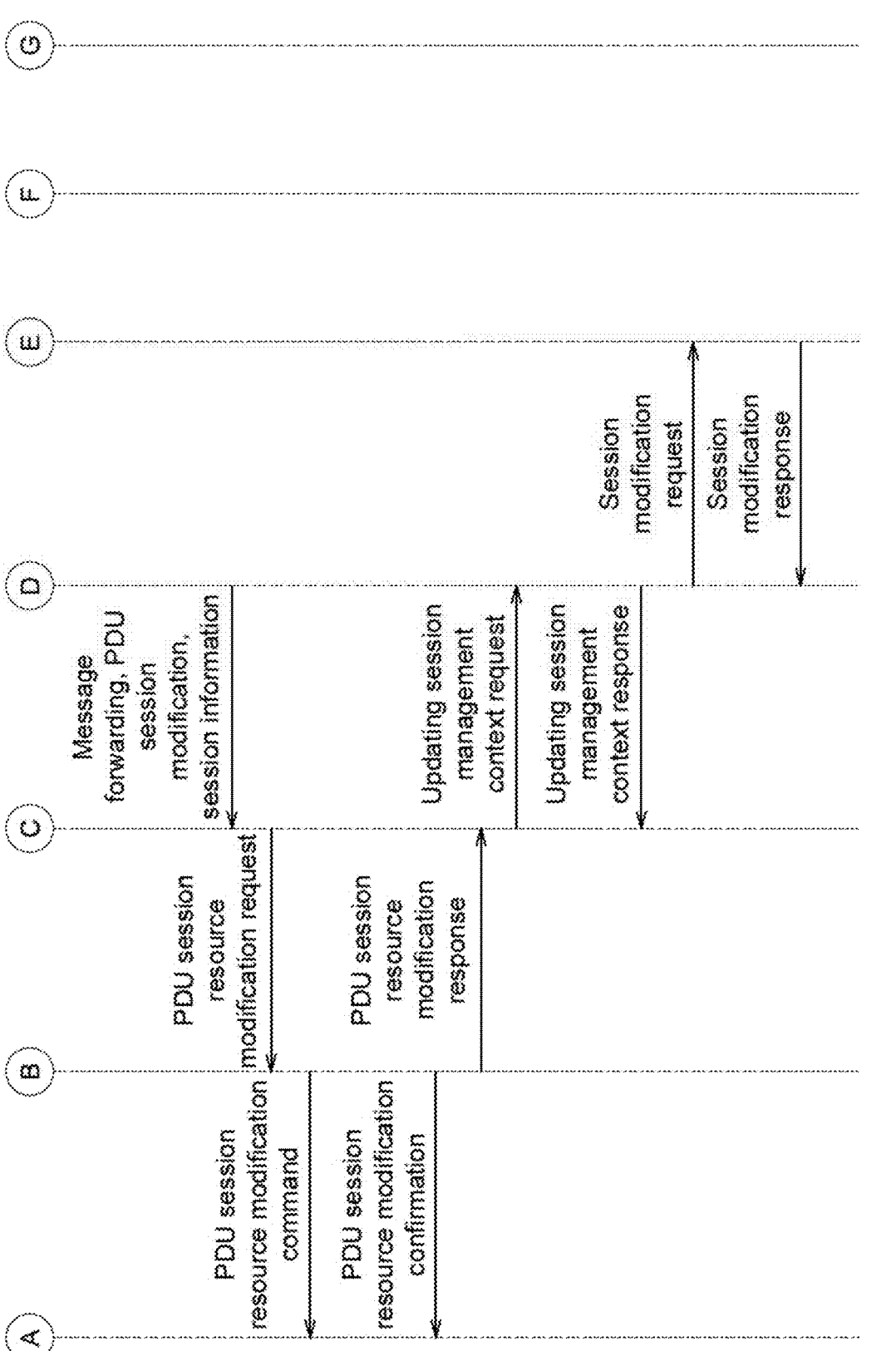
Figure 7C:
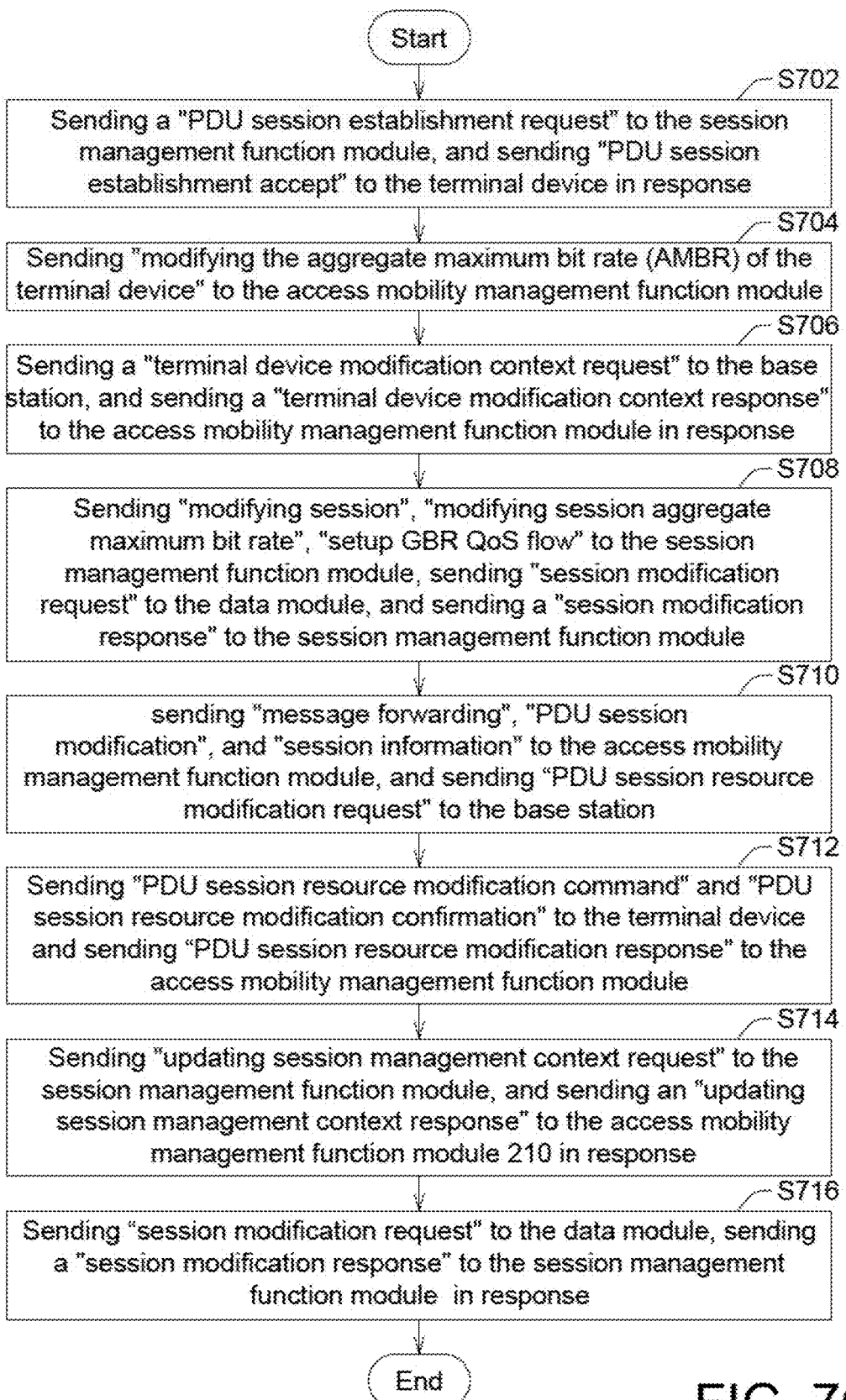
FIG. 7C is a flow chart of the transmission process of the messages/commands in FIGS. 7A and 7B.

FIGS. 7A and 7B are schematic diagrams illustrating transmission of messages/commands between modules of the communication system 1000 during the session modification process of the QoS flow. FIG. 7C is a flow chart of the transmission process of the messages/commands in FIGS. 7A and 7B. Referring to both FIGS. 7A and 7C, first, step S702 is performed: the terminal device 50 sends a "PDU session establishment request" to the session management function module 220. Furthermore, the session management function module 220 sends "PDU session establishment accept" to the terminal device 50 in response. Then, step S704 is executed: the management module 100 sends "modifying the aggregate maximum bit rate (AMBR) of the terminal device" to the access mobility management function module 210.

Then, step S706 is executed: the access mobility management function module 210 sends a "terminal device modification context request" to the base station 600. Furthermore, the base station 600 sends a "terminal device modification context response" to the access mobility management function module 210 in response. Then, step S708 is executed: the management module transmits "modifying session", "modifying session aggregate maximum bit rate", "set GBR QoS flow", "modifying GBR QoS flow", or "release GBR QoS flow" to the session management function module 220. The "setup GBR QoS flow" command is used to establish a new GBR QoS flow, and set the rules of the QoS flow. Moreover, the "modifying GBR QoS flow" command is used to modify the GBR QoS flow. Furthermore, the "release GBR QoS flow" command is used to delete the GBR QoS flow. The authorized QoS flow description can be set using the correct operation code, so as to indicate that the GBR QoS flow has been established, modified, or deleted.

In addition, the session management function module 220 sends a "session modification request" to the data module 400, and the data module 400 sends a "session modification response" to the session management function module 220 in response. The session modification associated with the QoS flow is an automatic session modification, which can automatically set a dedicated QoS flow for the application slice through the data flow detector.

Next, referring to both FIGS. 7B and 7C, step S710 is subsequently executed: the session management function module 220 sends "message forwarding", "PDU session modification", and "session information" to the access mobility management function module 210. Furthermore, the access mobility management function module 210 sends the "PDU session resource modification request" to the base station 600. Then, step S712 is executed: the base station 600 transmits the "PDU session resource modification command" and the "PDU session resource modification confirmation (i.e. Ack)" to the terminal device 50. Furthermore, the base station 600 sends the "PDU session resource modification response" to the access mobility management function module 210.

Then, step S714 is executed: the access mobility management function module 210 sends an "updating session management context request" to the session management function module 220. Furthermore, the session management function module 220 sends an "updating session management context response" to the access mobility management function module 210 in response. Then, step S716 is executed: the session management function module 220 sends the "session modification request" to the data module 400. Furthermore, the data module 400 sends a "session modification response" to the session management function module 220 in response.

In summary, the resource reservation and application slice allocation of the communication system 1000 of the present disclosure are performed according to three mechanisms: based on refined application slice of the application program defined by a specific user, which is executed on a specific terminal device, based on an application slice of a known application program that needs to ensure communication quality (such as, video conferencing application programs), and based on an application slice of terminal device or device type designated by a user terminal. Therefore, compared with existing communication systems, the communication system 1000 of the present disclosure has the following technical advantages: resource reservation and application slice allocation may be performed based on the combination of application programs and terminal devices, which can ensure a protection for the end-to-end network.

Moreover, the communication system 1000 of the present disclosure may provide and allocate a configuration file for QoS configuration to the device group of the application program and the terminal device. Also, transmission procedures of signals and commands for QoS flow of the 5G system as well as QoS procedures issued by network side are taken to set application slice. Moreover, the communication system 1000 of the present disclosure can perform resource reservation statically or dynamically according to the operating states of the application program (i.e., the application program is in an undergoing state or an idle state).

It will be apparent to those skilled in the art that various modifications and variations can be made to the disclosed embodiments. It is intended that the specification and examples be considered as exemplars only, with a true scope of the disclosure being indicated by the following claims and their equivalents.

What is claimed is:

1. A communication system, coupled to a terminal device through an air interface, and the terminal device executes an application program, the communication system comprises:

a data management repository module executed on a hardware processor, for storing a configuration file of the terminal device, the configuration file reflects a quality of service (QOS) requirement of the terminal device;

a control module executed on the hardware processor, for detecting an activation of the application program on the terminal device, and allocating at least one application slice to the application program on the terminal device according to the configuration file, wherein the control module comprises:

a session management function module executed on the hardware processor, for setting a packet data unit session (PDU session) for the application program of the terminal device, wherein, the communication system reserves an end-to-end resource for the application program of the terminal device according to the QoS requirement of the terminal device, the end-to-end resource comprises a radio resource, a core network application resource and a core network user plane resource, wherein, in connection with setting the PDU session, the session management function module allocates the at least one application slice according to the configuration file of the terminal device, so as to statically perform a reservation of the end-to-end resource;

wherein, after a setup for the PDU session is completed and a plurality of data packets in physical begin to be transmitted, the session management function module dynamically modifies an allocation for the at least one application slice according to a plurality of attributes of a packet flow, so as to dynamically perform the reservation of the end-to-end resource, a data module executed on the hardware processor, comprising a data packet filter, for identifying the attributes of the packet flow, wherein, the attributes comprise at least an internet protocol (IP) address of the packet flow, a transmission protocol type of the packet flow, and a port number of a transmission connecting port associated with the packet flow.

2. The communication system of claim 1, wherein the radio resource is allocated to at least one data radio bearer, and the core network application resource and the core network user plane resource are allocated to a quality of service flow (QOS flow).

3. The communication system of claim 2, wherein the QoS flow has a level of guaranteed bit rate (GBR) or a level of not guaranteed bit rate (non-GBR).

4. The communication system of claim 1, wherein the configuration file of the terminal device records an identification code of the terminal device, a type of the terminal device, a device group for the terminal device, an identification code of the at least one application slice corresponding to the terminal device, and a plurality of QoS parameters.

5. The communication system of claim 4, wherein the QoS parameters at least comprise a 5G QoS Identifier (5QI), a guaranteed flow bit rate (GFBR), a maximum flow bit rate (MFBR), and a maximum packet loss rate (MPLR), session aggregate maximum bit rates (session AMBR), and user equipment aggregate maximum bit rates (UE-AMBR).

6. The communication system of claim 1, wherein when the terminal device is coupled to the communication system, the control module sets a quality of service flow (QOS flow) for the application program, so as to statically execute the reservation of the end-to-end resource.

7. The communication system of claim 1, wherein the data module further comprising:

a data flow detector, for detecting a traffic of the data packets, wherein, the session management function module allocates or modifies a quality of service (QOS) flow according to the traffic of the data packets.

8. A resource reservation method, applied to a communication system, wherein the communication system is coupled to a terminal device through an air interface, and the terminal device executes an application program, and the resource reservation method comprising:

storing a configuration file of the terminal device by a data management repository module of the communication system, and the configuration file reflects a quality of service (QOS) requirement of the terminal device;

detecting an activation of the application program on the terminal device, by a control module of the communication system;

wherein the control module comprises:

a session management function module, for setting a packet data unit session PDU session) for the application program of the terminal device, allocating at least one application slice to the application program on the terminal device according to the configuration file, by the control module, wherein, the communication system reserves an end-to-end resource for the application program of the terminal device according to the QoS requirement of the terminal device, the end-to-end resource comprises a radio resource, a core network application resource and a core network user plane resource, wherein, in connection with setting the PDU session, the session management function module allocates the at least one application slice according to the configuration file of the terminal device, so as to statically perform a reservation of the end-to-end resource;

wherein, after a setup for the PDU session is completed and a plurality of data packets in physical begin to be transmitted, the session management function module dynamically modifies an allocation for the at least one application slice according to a plurality of attributes of a packet flow, so as to dynamically perform the reservation of the end-to-end resource, and identifying, using a data module comprising a data packet filter, the attributes of the packet flow, wherein, the attributes comprise at least an internet protocol (IP) address of the packet flow, a transmission protocol type of the packet flow, and a port number of a transmission connecting port associated with the packet flow.

9. The resource reservation method of claim 8, further comprising:

allocating the radio resource to at least one data radio bearer, by the control module; and allocating the core network application resource and the core network user plane resource to a quality of service flow (QOS flow), by the control module.

10. The resource reservation method of claim 8, wherein the step of allocating the at least one application slice to the application program according to the configuration file comprises:

setting a packet data unit session (PDU session) for the application program of the terminal device, by a session management function module of the control module; and when setting the PDU session, allocating the at least one application slice according to the configuration file of the terminal device by the session management function module, so as to statically perform a reservation of the end-to-end resource.

* * * * *